July 15, 1941. P. H. KOLB 2,249,389
SPEED INDICATING AND CONTROLLING DEVICE
Filed May 24, 1938 2 Sheets-Sheet 1
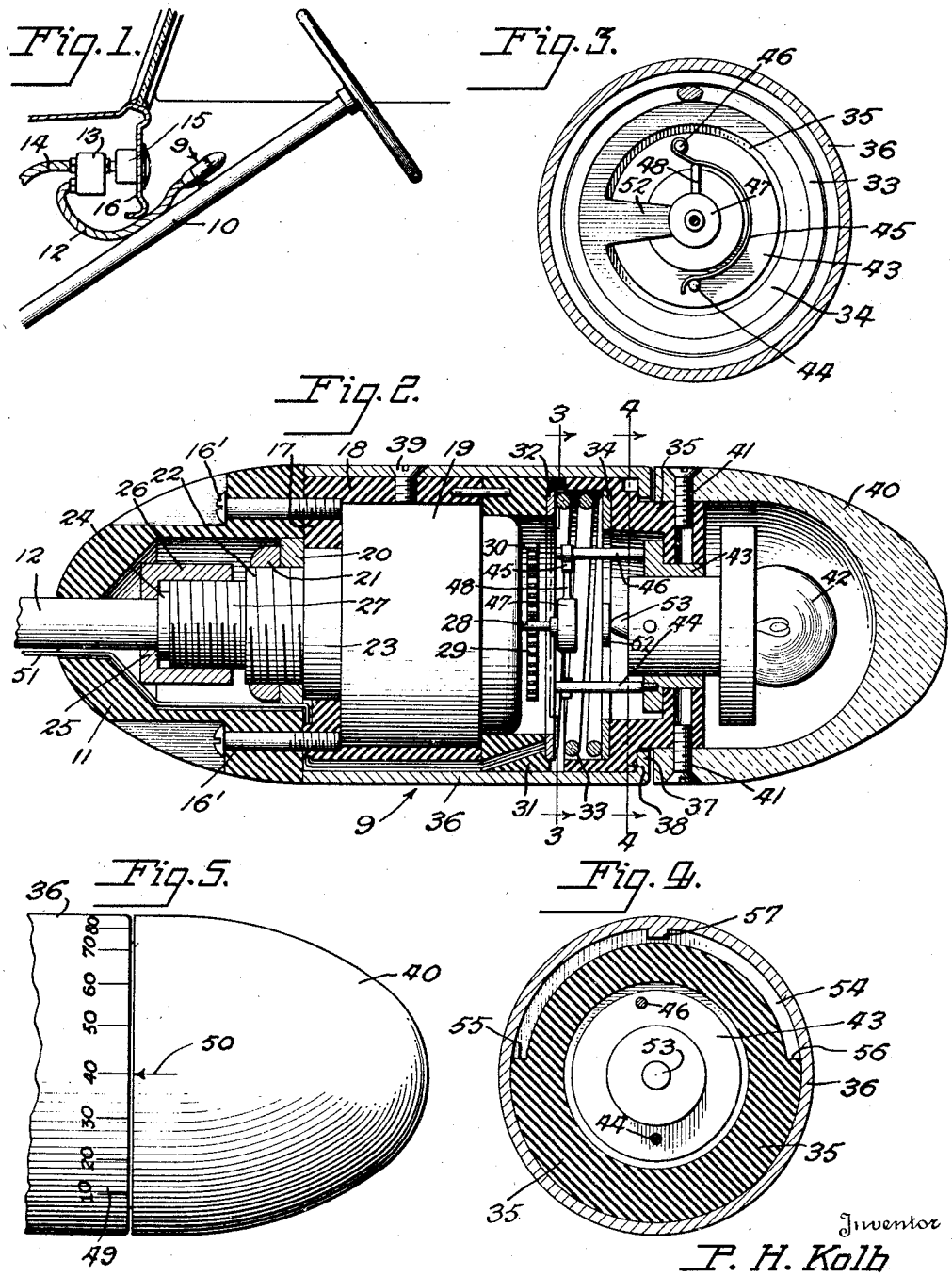
Inventor
P. H. Kolb July 15, 1941.  P. H. KOLB  2,249,389
SPEED INDICATING AND CONTROLLING DEVICE
Filed May 24, 1938   2 Sheets-Sheet 2
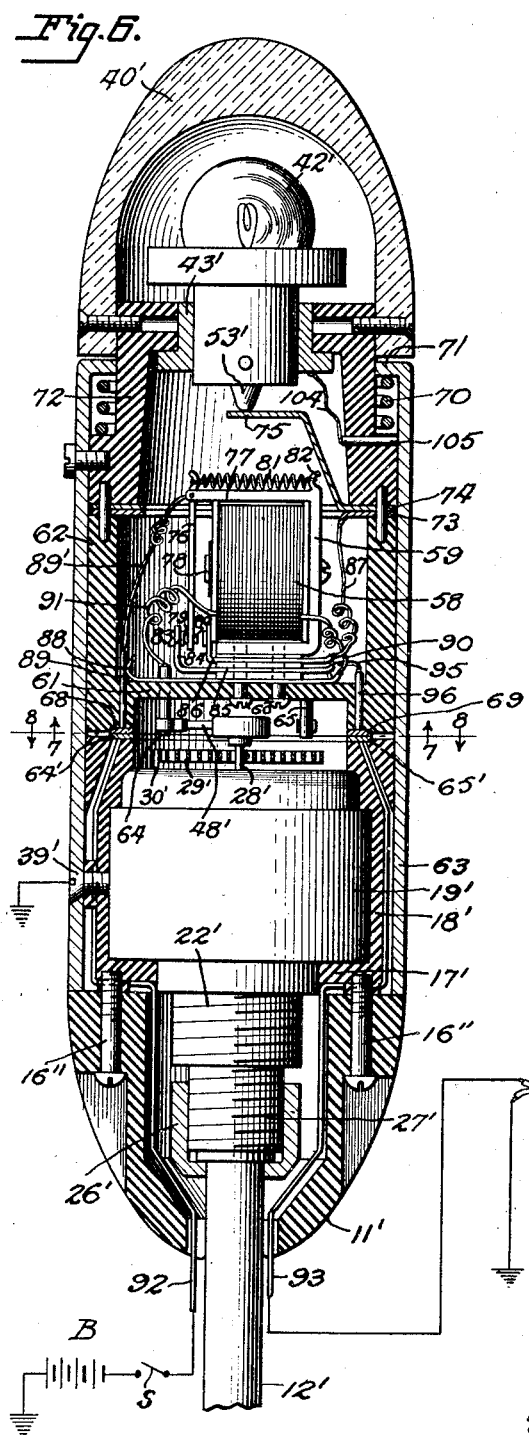
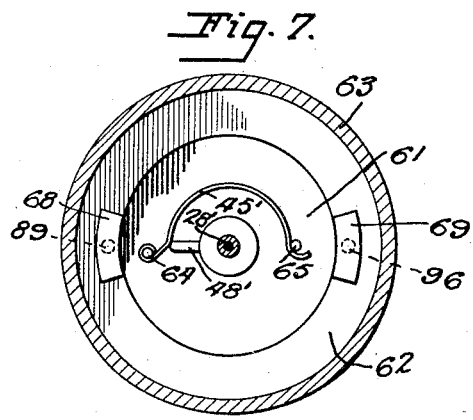
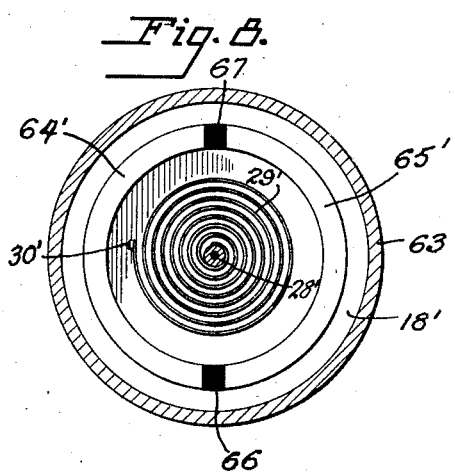
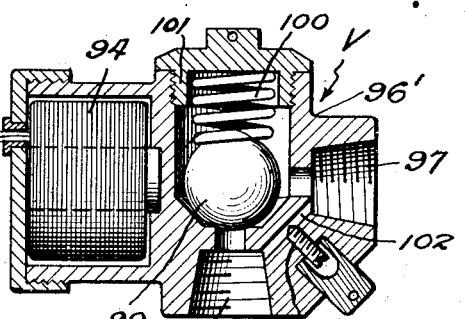
Inventor
P. H. Kolb
By Mason Fenwick & Lawrence
Attorneys Patented July 15, 1941

2,249,389

UNITED STATES PATENT OFFICE 2,249,389

SPEED INDICATING AND CONTROLLING DEVICE

Paul Huber Kolb, Williamsport, Pa.

Application May 24, 1938, Serial No. 209,829

9 Claims. (Cl. 177—311.5)

The invention forming the subject matter of the present application is in the nature of a maximum speed indicating and controlling device designed to be connected to any rotatable part of a motor vehicle to prevent movement of that vehicle beyond a predetermined speed and to give a signal whenever such vehicle attains the maximum speed for which the instrument is set.

As is well known in this art, governor-operated controls are in common use on motor vehicles to control the speed of the engines thereof. Where vehicles so equipped are in movement on substantially horizontal roads, such governor-operated controls are fairly effective to prevent movement of the vehicle beyond a predetermined speed.

Another object of the invention is to provide an instrument of the character referred to which can be readily connected to the speed-responsive shaft in common use for operating conventional speedometers with which most automobiles are equipped.

Other objects of the invention will become apparent as the detailed description thereof proceeds.

In the drawings:

Figure 1 is a fragmentary side elevation illustrating a practical embodiment of this invention as applied to the steering column of a motor vehicle;

Figure 2 is a central, longitudinal section through a maximum speed indicator constructed in accordance with this invention;

Figure 3 is a section taken on the line 3—3 of Figure 2;

Figure 4 is a section taken on the line 4—4 of Figure 2;

Figure 5 is a fragmentary elevation illustrating a maximum speed setting scale as applied to a visible part of the said indicator;

Figure 6 is a central, longitudinal section of another form of the invention which includes mechanism settable to control the speed of the vehicle within predetermined limits;

Figure 7 is a section taken on the line 7—7 of Figure 6; and

Figure 8 is a section taken on the line 8—8 of Figure 6.

The form of the invention illustrated in Figures 1 to 5, inclusive, is designed to serve merely as a warning signal connected to a speed-responsive part of a motor vehicle to indicate to the driver when the vehicle has attained or exceeded a predetermined maximum speed. In this form, the invention comprises a casing designated generally by the reference numeral 9 adapted to be secured, in any convenient position for observation by the driver, to some part of a motor vehicle such as the steering column 10.

The casing 9 comprises a base member 11 of insulating material bored axially to receive rotatably a flexible shaft 12 connected for rotation through a gear box 13 to a flexible shaft 14 which rotates in response to the speed of the vehicle. The shaft 14 is continued through the gear box to operate a conventional speedometer 15 suitably secured to the dashboard 16 of the vehicle.

The base member 11 is secured by screws 16′ to an inwardly directed flange 17 formed on one end of an insulating, cylindrical inner casing 18 in which the metallic casing 19 of a magnetic speedometer is suitably secured, as by means of the clamping and lock nuts 20 and 21, screw-threaded onto an externally threaded tubular member 22 projecting axially from the lower end of the stator 23. The shaft 12 is provided at one end with an outwardly directed flange 24 which is clamped by an inwardly directed flange 25 on the end of the sleeve 26 in screw-threaded connection with a member 27 which projects through the member 22 and which is fixed to and forms part of the rotor of the magnetic speed-responsive device. A pin 28 is fixed to and projects axially from the speed responsive member and is biased to zero position by means of the spiral spring 29 fixed at one of its ends to said pin 28 and at its other end to a pin 30 projecting from and fixed to the stator 23. The essential feature of this part of the invention is that the pin 28 shall turn in response to and proportionally with the speed of the vehicle upon which the instrument is mounted.

A sleeve 31 of insulating material is doweled to the upper end of the casing 18 and is recessed at its upper edge to receive a conducting ring 32 which forms a seat for one end of a compression spring 33. The other end of the spring 33 abuts a conducting ring 34 seated against a shoulder formed in a cup shaped member 35 mounted for rotation in the metallic casing 36. The latter encloses the casing 18 and the sleeve 31 and has its upper end inturned to form a retaining flange 37 extending over a shoulder 38 formed on the member 35. The metallic casing 36 is secured to the insulating casing 18 by means of screws 39, only one of which appears in the drawings. The member 35 has a peripheral groove 54, the ends of which at 55 and 56 are adapted to abut against an inwardly directed lug 57 on the casing 36 to limit the rotation of member 35 establishing the range and adjusting the angular position of the posts 44 and 46, thus setting the point at which the contact 48 will engage the spring contact 45.

A transparent lens 40 is detachably secured by screws 41 to the insulating member 35 and encloses a light bulb 42 seated in a socket member 43 suitably secured to the member 35. A rod 44 extends from the socket member 43 to engage the free end of a spring contact strip 45, the other end of which is fixed to one end of a conducting pin 46 which is also fixed to and extends from the socket member 43. The pins 44 and 46 are arranged on opposite sides of the speed-responsive pin 28 which has a disk 47 suitably fixed to the outer end thereof. A contact pin 48 extends radially from the disk 47 and is rotatable into and out of wiping contact with the contact spring 45 in accordance with the speed-responsive movements of the pin 28.

The outer surface of the metallic casing 36 is provided with a speed-indicating scale 49 adapted to indicate, in conjunction with the index 50 on the lens 40, the speed for which the instrument is set. Current for operating the bulb 42 is conducted, from a battery or other suitable source of electric energy, one side of which is grounded by the wire 51 to the conducting ring 32 and then through the compression spring 33 to the conducting ring 34, from which extends the radial conducting member 52 in yielding contact with the usual contact member 53 of the ordinary electric light bulb 42. The clamp circuit is completed through socket 43, conducting posts 44 and 46, contact spring 45, contact 48, stator 19, and grounded screw 39, or through the rotor and shaft 12 to ground.

It will be obvious from inspection of the drawing that only when the radial pin 48 is in contact with the spring contact 45 will there be a closed circuit for the lamp 42.

The form of the invention disclosed in Figures 6 to 8, includes a relay adjustable along with the signal operating mechanism, to control the supply of liquid fuel to the internal combustion engine of the automobile. In this case, the speed-responsive and signal elements of the invention are identical with the corresponding element shown in Figure 2, and are accordingly designated by the same reference numerals primed.

The relay for controlling the supply of fuel is interposed between the speed-responsive and signalling mechanisms. This relay comprises an electro-magnet 58 suitably secured in a U-shaped frame 59 having one leg thereof fixed by the screws 60, through a series of conducting and insulating plates, to a crossbar 61 forming part of an insulating cylindrical member 62 mounted for rotation within the metallic casing 63 which encloses the speed-responsive mechanism and is secured to a fixed part thereof by means of the grounded screw 39'. The rods 64 and 65 which support the contact spring 45' are fixed to and extend from the crossbar 61 and are designed to hold the spring in the path of the contact rod 48' in the same manner as in the signalling mechanism illustrated in Figure 2.

The insulating casing 18' is recessed at its upper edge to receive the semi-circular contact plates 64' and 65' separated by the insulation segments 66 and 67 (see Figure 8). Conducting shoes 68 and 69 are set into the edge of the insulating casing 62 and are designed to be held in sliding contact with the conducting plates 64' and 65', respectively, by means of a compression spring 70 interposed between the inturned flange 71 at the upper end of the casing 63 and a shoulder formed on an insulating member 72 which is doweled to the adjacent edge of the insulated casing 62. Conducting rings 73 and 74 in contact with each other are clamped between the adjacent doweled edges of the insulating casings 62 and 72. The ring 74 has an extension 75 projecting therefrom into yielding contact with the member 53' of the light bulb 42'.

An armature 76 is pivoted between its ends to the upper end of the leg 77 of the U-shaped frame 59. The longer arm of the armature 76 extends over the core 78 of the electro-magnet 58, and is provided at its free end, with contacts 79 and 80. The short arm of the armature is connected to one end of a tension spring 81, the other end of which is fixed to a lug 82 projecting from the lower end of the U-shaped frame 59.

The tension spring 81 normally maintains the armature with its contact 79 in contact with a contact 83 fixed to an arm 84 formed on the upper end of a contact plate 85 which is clamped between insulating plates interposed between the U-shaped frame 59 and the cross-bar 61. The lower contact 80 is adapted, when the armature 76 is drawn down by energization of the magnet 58, to make contact with the upper end of a conducting plate 86, the lower end of which is connected by wiring 87 to the conductor ring 73. A conducting plate 88 is clamped against the crossbar 61 with its upper end bent to form contact with a conducting pin 89 suitably secured to the shoe 68, the lower end of the plate 88 being connected by a wire 90 to one terminal of the electro-magnet 58. The other terminal of the magnet is connected by wire 91 to the conducting pin 64 which supports the spring contact 45'.

The battery B forms a source of electrical energy connected by wiring 92 and switch S to the conducting plate 64'; and the wiring 93 connects the conducting plate 65' to an electro-magnet 94 which controls the operation of the valve designated generally by the reference character V and controlling the supply of liquid fuel to the internal combustion engine. The lower end of the plate 84 is connected by a wire 95 to a pin 96 suitably secured to the conducting shoe 69. The valve V comprises a non-magnetic casing 96' having a inlet end provided with screw-threads to be suitably secured to a source of liquid fuel supply. The inlet passageway 97 of this casing communicates with an outlet passageway 98 normally closed by a ball valve 99 pressed to its seat by means of the compression spring 100 which is seated at one end in a recess formed in a thimble 101 adjustable on the casing 96'.

The spring 100 is so designed and adjusted that energization of the magnet 94 will raise the ball valve against the pressure of the spring 100 to establish communication between the inlet and outlet passageways 97 and 98. Normally, the magnet 94 will be continuously energized to permit the free flow of liquid fuel through the said passageways to the internal combustion engine. Whenever the magnet 94 becomes deenergized, the pressure of the spring 100 forces the ball valve to its seat and cuts off the free flow of liquid fuel through said passageway.

It is not intended to cut off the fuel supply to the engine completely when the vehicle attains the selected maximum speed. To permit the opration of the engine at speeds below the maximum, the casing 96' is provided with a by-pass 102 connecting the inlet passageway 97 with the outlet passageway 98. The rate of flow of liquid fuel through the by-pass 102 may be regulated by means of the valve 103 to permit operation of the engine at any desired speed below the selected maximum speed.

The casing 63 may be provided with a scale of speeds similar to that shown in Figure 5 of the drawings, and the lens 40' may, likewise, be provided with an index to determine the maximum speed setting of the instrument. The graduations on the scale 49 may be determined empirically by operating the motor vehicle at the desired maximum speed and then by turning the lens 40 or 40', as the case may be, until the lamp 42 becomes energized at that particular speed. The by-pass valve 103 may then be regulated to secure any desired speed below the selected maximum.

In the operation of the device shown in Figures 6 to 8 of the drawings, the lens 40' and the elements secured thereto are set in the casing 63 for some selected maximum speed. In this set position it may be sealed; and the by-pass valve 103 may also be sealed in any well known manner. While the motor vehicle is moving below the predetermined speed, current from the battery B passes into the instrument to the wiring 92 into contact with the plate 64'. From the plate 64', current passes through the shoe 68, pin 89, and wiring 89' connecting the end of the pin 89 to the hinged end of the conducting armature 76. Current passes through the armature 76, plate 84, wiring 95, pin 96, shoe 69, plate 65' and wiring 93 to energize the electro-magnet 94 and maintain the ball valve 99 removed from its seat to permit the free flow of liquid fuel through the valve V to the engine.

So long as the automobile is moving below the selected maximum speed, the magnet 94 will be energized. As soon as the maximum speed is attained, the contact arm 48' on the speed-responsive device makes contact with the spring contact 45'. This operation closes the circuit through the conducting pin 89, spring plate 88, wiring 90, electro-magnet 58, wiring 91, pin 64, contact spring 45', speed-responsive contact pin 48', and the stator of the speed-responsive member to ground through the screw 39'. The magnet 58 becomes energized and draws the armature 76 into contact with the upper end of the plate 86 and out of contact with the arm 84. This means that the circuit to the wire 93 to the electro-magnet 94 of the fuel control valve V becomes broken, and the ball valve 99 becomes seated to close the main passageway through the fuel supply valve. At the same time, the circuit to the lamp 42' is completed through wire 87, rings 73 and 74 and extensions 75 to the contact member 53' of the signal 42' which is connected by wire 104 and pin 105 to the grounded metallic casing 63.

Since this device is to be used on existing as well as new motor vehicles of the types now in common use, the device will be controlled by the usual ignition switch, since it is only to be used while the vehicle is in operation. Auxiliary or separate switches can be used however, but it is preferable to use the well known ignition switch.

It is is be understood that this instrument is not to be considered as an attachment to a conventional speedometer, but is a separate instrument which can be readily attached in any convenient position to a fixed part of a motor vehicle and operated by connecting its speed-responsive mechanism to any part of the vehicle rotatable in accordance with the speed thereof. The speed scale indications may be omitted altogether and the setting mechanism can be adjusted for operation of the signal and relay at any selected speed indicated on the conventional speedometer with which motor vehicles are commonly supplied.

It will also be understood that the invention is not to be considered as limited to the particular details of construction shown in the drawings nor in any other manner except as indicated by the scope of the claims appended hereto.

What I claim is:

1. Device settable to indicate any desired speed of an auto vehicle comprising a magnetic speedometer having a speed responsive angularly turnable shaft projecting from one end, a pin extending laterally from said projecting end, an electrically actuated indicator, and an arcuate spring yieldingly supported in the path of movement of the end of said pin to be contacted thereby upon attainment of the speed for which the indicator is set, and to be wiped thereby when said speed is exceeded, means for adjusting said spring about the axis of said pin to advance or retract the point of contact of said pin with said spring, said pin and spring being the terminals of an electrical circuit in which said indicator is intercalated.

2. Device settable to indicate any desired speed of an auto vehicle comprising a magnetic speedometer having a speed responsive angularly turnable shaft projecting from one end, a pin extending laterally from said projecting end, and a unit comprising an electrically actuated indicator and an arcuate spring carried by said unit, yieldingly supported in the circumferential path of movement of the end of said pin to be contacted thereby upon attainment of the speed for which the indicator is set, and to be wiped thereby when said speed is exceeded, means for adjusting said unit axially of said pin to advance or retract the point of contact of said pin with said spring, said pin and spring being the terminals of an electrical circuit in which said indicator is intercalated.

3. Device settable to indicate any desired speed of an auto vehicle comprising a magnetic speedometer having a speed responsive angularly turnable shaft projecting from one end, a spring biasing said shaft toward zero position, a pin extending laterally from said projecting end, a unit comprising an electrically actuated indicator and an arcuate spring yieldingly supported in the circumferential path of movement of the end of said pin to be contacted thereby upon attainment of the speed for which the indicator is set, and to be wiped thereby when said speed is exceeded, means for adjusting said unit axially of said pin to advance or retract the point of contact of said pin with said spring, said pin and spring being the terminals of an electrical circuit in which said indicator is intercalated, said unit including a light transmitting cap enclosing said indicator having an index referred to an adjacent circumferential scale on a fixed part of the device.

4. Device settable to indicate a desired engine speed comprising a hollow casing of insulation material including a speedometer containing portion and a signal carrying portion relatively coaxially angularly displaceable, and a metallic shell holding said portions together, fixed to one and freely embracing the other, electrically connected angularly displaceable brushes on said portions, an electrically actuated signal on said signal carrying portion, said brushes being in series circuit with one terminal of said signal and a grounded electrical source, a speedometer in said speedometer containing portion having a speed responsive turnable shaft projecting from one end with a laterally extending pin, an arcuate spring carried by said signal carrying portion yieldingly supported in the path of movement of said pin to be contacted thereby upon attainment of the speed for which the device is set and to be wiped thereby when said set speed is exceeded, said spring and pin being in series circuit with the other terminal of said signal and with ground means for adjusting said spring angularly with respect to said signal carrying portion to advance or retract the point of contact of said pin with said spring.

5. Device settable to indicate a desired engine speed comprising a hollow casing of insulation material including a speedometer containing portion and a signal carrying portion relatively coaxially angularly displaceable, and a metallic shell holding said portions together, fixed to one and freely embracing the other, electrically connected angularly displaceable brushes on said respective portions, said signal carrying portion being part of a unit including an electric lamp socket carried thereby, an electric lamp in said socket and a light transmitting cap fixed to said signal carrying portion, enclosing said lamp, said brushes being in series circuit with one terminal of said lamp and a grounded electrical source, a speedometer in said speedometer containing portion having a speed responsive turnable shaft projecting from one end with a laterally extending pin, an arcuate spring carried by said unit yieldingly supported in the path of movement of said pin to be contacted thereby upon attainment of the speed for which the device is set and to be wiped thereby when said set speed is exceeded, said spring and pin being in series circuit with the other terminal of said lamp and with ground, and means for adjusting said spring angularly with respect to said unit to advance or retract the point of contact of said pin with said spring.

6. Device settable to indicate a desired engine speed comprising a hollow casing of insulation material including a speedometer containing portion and a signal carrying portion relatively coaxially angularly displaceable, and a metallic shell holding said portions together, fixed to the speedometer containing portion and having an inturned flange overhanging an exterior shoulder on the signal carrying portion, spaced parallel angular displaceable conductor rings on the adjacent ends of the respective casing portions, a spiral spring between said rings electrically connecting them and biasing said casing portions apart in said shell, said signal carrying portion being part of a unit including an electric lamp socket carried thereby, an electric lamp in said socket and a light transmitting cap fixed to said signal carrying portion of said casing enclosing said lamp, said rings being in series circuit with one terminal of said lamp and a grounded electrical source, a speedometer in said speedometer containing portion having a speed responsive turnable shaft projecting from one end with a laterally extending pin, an arcuate spring carried by said unit yieldingly supported in the path of movement of said pin to be contacted thereby upon attainment of the speed for which the indicator is set and to be wiped thereby when said set speed is exceeded, said arcuate spring and pin being in series circuit with the other terminal of said lamp through said socket, and with ground, and means for adjusting said arcuate spring angularly with respect to said unit to advance or retract the point of contact of said pin with said arcuate spring.

7. Device as claimed in claim 6, said light-transmitting cap having an index referred to an an adjacent circumferential scale on said shell.

8. Device settable to indicate a desired engine speed and to operate an engine speed decelerating means when said speed is exceeded, comprising a hollow casing of insulation material including a speedometer containing portion and a signal carrying portion, relatively coaxially angularly displaceable, and a metallic shield holding said portions together fixed to one and freely embracing the other, pairs of brushes, the brushes of the respective pairs being on the respective casing portions, angularly displaceable with said casing portions, and electrically connected, said signal carrying portion being part of a unit including a lamp socket carried thereby and an electric lamp in said socket, a solenoid and switch operated thereby, in said casing, said switch being adapted to be connected in circuit with an electrical source and an electrically controlled engine speed decelerating device, one pair of brushes being in series circuit with one terminal of said lamp, said solenoid, and a grounded electrical source, a speedometer in said speedometer containing portion of said casing having a speed responsive turnable shaft projecting from one end with a laterally extending pin, an arcuate spring carried by said unit yieldingly supported in the path of movement of said pin to be contacted thereby upon attainment of the speed for which the device is set and to be wiped thereby when said speed is extended, said spring and pin being in series circuit with the other terminal of said lamp and with ground, and means for adjusting said spring angularly with respect to said unit, to advance or retract the point of contact of said pin with said spring.

9. Device as claimed in claim 8, said light-transmitting cap being fixed with respect to said signal carrying portion of said casing, and having an index referred to an adjacent circumferential scale carried by said shield.

PAUL HUBER KOLB.